(12) United States Patent
Lei et al.

(10) Patent No.: US 9,974,088 B2
(45) Date of Patent: May 15, 2018

(54) ACCESS POINT

(71) Applicant: Hangzhou H3C Technologies Co., Ltd., Hangzhou (CN)

(72) Inventors: Yanbing Lei, Beijing (CN); Guojun Zhou, Beijing (CN); Ningyu Yue, Beijing (CN); Xingchuang Guo, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 140 days.

(21) Appl. No.: 14/769,029

(22) PCT Filed: Feb. 17, 2014

(86) PCT No.: PCT/CN2014/072124
§ 371 (c)(1),
(2) Date: Aug. 19, 2015

(87) PCT Pub. No.: WO2014/154062
PCT Pub. Date: Oct. 2, 2014

(65) Prior Publication Data
US 2016/0007364 A1    Jan. 7, 2016

(30) Foreign Application Priority Data

Mar. 29, 2013   (CN) .......................... 2013 1 0109496

(51) Int. Cl.
*H04W 72/08*    (2009.01)
*H04B 7/022*    (2017.01)
(Continued)

(52) U.S. Cl.
CPC .......... *H04W 72/085* (2013.01); *H04B 7/022* (2013.01); *H04B 7/0413* (2013.01);
(Continued)

(58) Field of Classification Search
CPC . H04W 72/085; H04W 16/20; H04W 72/046; H04W 72/0446; H04W 7/0413
See application file for complete search history.

(56) References Cited

U.S. PATENT DOCUMENTS

2004/0082356 A1*   4/2004   Walton ................... H04B 7/022
                                                                                 455/522
2012/0208581 A1*   8/2012   Ishida ................... H04B 7/0691
                                                                                 455/509

FOREIGN PATENT DOCUMENTS

CN    102883335    1/2013
CN    102932959    2/2013
JP    2012204893    10/2012

OTHER PUBLICATIONS

International Search Report and Written Opinion dated Jul. 8, 2014 issued on PCT Patent Application No. PCT/CN2014/072124 dated Feb. 17, 2014, The State Intellectual Property Office, P.R. China.

* cited by examiner

*Primary Examiner* — Anez Ebrahim
(74) *Attorney, Agent, or Firm* — DEQI IIntellectual Property Law Corporation

(57) ABSTRACT

An access point (AP) for an indoor antenna distributed deployment environment provides an access service for a wireless terminal. The AP includes N radio frequency (RF) processing units and N*M RF switches (RFSs). Each RFS includes a public port and at least two branch ports. The at least two branch ports respectively connect with at least two antennas deployed in different indoor areas via RF feeders. The RF processing unit includes M RF chains. Each RF chain is connected to a public port of an RFS. The RF processing unit is to transmit a packet to the wireless terminal, based on a predetermined antenna combination for the wireless terminal.

20 Claims, 6 Drawing Sheets

(51) Int. Cl.
  *H04B 7/0413* (2017.01)
  *H04W 16/20* (2009.01)
  *H04W 72/04* (2009.01)
  *H04W 88/08* (2009.01)
(52) U.S. Cl.
  CPC ......... *H04W 16/20* (2013.01); *H04W 72/046* (2013.01); *H04W 72/0446* (2013.01); *H04W 88/085* (2013.01)

| first kind of antenna combination | second kind of antenna combination | third kind of antenna combination | fourth kind of antenna combination | fifth kind of antenna combination | sixth kind of antenna combination | seventh kind of antenna combination | eighth kind of antenna combination |
|---|---|---|---|---|---|---|---|
| 1ms | 2ms | 3ms | 4ms | 5ms | 6ms | 7ms | 8ms |
| 9ms | 10ms | 11ms | 12ms | 13ms | 14ms | 15ms | 16ms |
| ... | ... | ... | ... | ... | ... | ... | ... |

FIG.6

ACCESS POINT

CLAIM FOR PRIORITY

The present application is a national stage filing under 35 U.S.C. § 371 of PCT application number PCT/CN2014/072124, having an international filing date of Feb. 17, 2014, which claims priority to Chinese patent application number 201310109496.1, having a filing date of Mar. 29, 2013, the disclosures of which are hereby incorporated by reference in their entireties.

BACKGROUND

With today's increasing development of multiple input multiple output (MIMO) and smart antenna technologies, MIMO wireless access points (APs) with smart antenna technologies have been applied widely to provide wireless coverage in the outdoor environment. However, traditional single input single output (SISO) APs are generally employed to provide distributed wireless coverage in the indoor environment. It is difficult to widely apply multiple-band MIMO technologies to provide distributed wireless coverage in the indoor environment.

BRIEF DESCRIPTIONS OF THE DRAWINGS

FIG. 6 is a schematic diagram illustrating how to change an antenna combination to receive a packet by a radio frequency (RF) processing unit based on a predetermined time period, in accordance with an example of the present disclosure.

DETAILED DESCRIPTIONS

Figure 1:
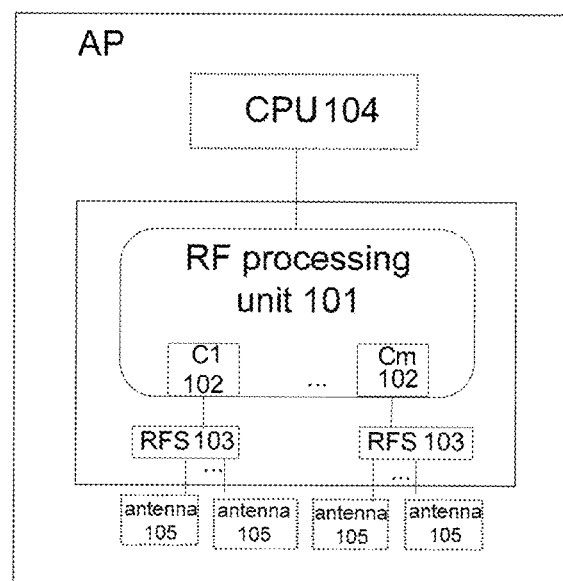
FIG. 1 is a schematic diagram illustrating a logical structure of an AP, in accordance with an example of the present disclosure.

FIG. 1 is a schematic diagram illustrating a logical structure of an AP, in accordance with an example of the present disclosure. The AP shown in FIG. 1 is to provide an access service for an indoor wireless terminal. The AP shown in FIG. 1 may include an RF processing unit 101, and M RF Switches (RFSs) 103, in which M is a natural number which is greater than or equal to 2.

The RF processing unit 101 may include M RF chains 102, that is, C1, . . . , Cm. The RF processing unit 101 may transmit a packet to a wireless terminal via an RF chain 102, or receive a packet transmitted by the wireless terminal via an RF chain 102.

Each RFS 103 may include a public port, which connects with an RF chain 102 of the RF processing unit 101, and at least two branch ports, which respectively connect with an antenna deployed in a different indoor area via at least two RF feeders. Under the control of the RF processing unit 101, the RFS 103 may switch among antennas connecting with different branch ports. The public port is to input and output an RF signal of a primary link. The branch port is to input and output a branch link's RF signal of the primary link's RF signal, which is selected by the RFS 103.

The AP shown in FIG. 1 may further include a central processing unit (CPU) 104. When needing to transmit a packet to a wireless terminal, or needing to receive a packet from the wireless terminal, the CPU 104 is to search in a terminal service table of a memory for an identifier of an antenna combination, which corresponds to the wireless terminal and is to transmit the wireless signal. The CPU 104 is further to submit the packet to be transmitted to the wireless terminal, and the identifier of the antenna combination searched out to the RF processing unit 101. An antenna combination in each table entry of the terminal service table is a better antenna combination, which is actually a group of parameters. When transmitting or receiving a packet, the RF processing unit 101 may select and connect multiple corresponding antennas, based on this group of parameters. Please refer to the example shown in Table 1.

TABLE 1

| Wireless terminal identifier | Antenna combination | Signal strength |
| --- | --- | --- |
| MAC1 | antennas 1, 2, 4 | X1 |
| MAC2 | antennas 1, 2, 3 | X2 |
| MAC3 | antennas 2, 3, 6 | X3 |
| . . . | . . . | . . . |

Based on the identifier of the antenna combination searched out by the CPU 104, the RF processing unit 101 may control the RFS 103 to select and connect multiple antennas corresponding to the identifier of the antenna combination searched out, and transmit the packet via the RF chain 102 by using the multiple antennas, or receive the packet from the wireless terminal via the RF chain 102 by using the multiple antennas.

The AP shown in FIG. 1 may further include M groups of antennas. Each group of antennas may include at least two antennas. The antennas are to receive a signal from the wireless terminal, or transmit a wireless signal to the wireless terminal under the control of the RF processing unit 101.

As shown in FIG. 1, the M groups of antennas are included in the AP. The M groups of antennas may also connect with the AP via cables. That is, the AP may not include the M groups of antennas.

The RF processing unit 101, the M RFSs 103 and the M groups of antennas shown in FIG. 1 may form an AP sub-unit 300, which will be described in detail in the following example illustrated with FIG. 3.

Figure 2:
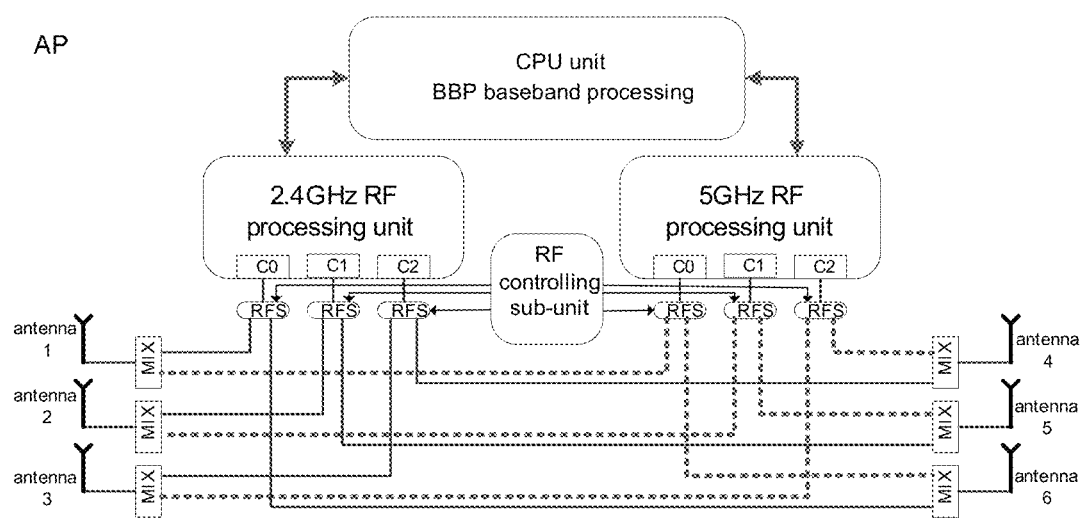
FIG. 2 is a schematic diagram illustrating a logical structure of an AP, in accordance with another example of the present disclosure.

As shown in FIG. 2, in an example, the AP may include a CPU, two RF processing units, that is, a 2.4 GHz RF processing unit and a 5 GHz RF processing unit, and three RFSs respectively connecting with each RF processing unit. Each RF processing unit may include three RF chains, which respectively connect with a public port of an RFS. Each RF chain refers to a separate path. A divided RF signal from a baseband unit may be transmitted along any of the separate paths. Each RFS may include two branch ports. Two branch ports of each RFS may be respectively connected with an independent antenna deployed in a different indoor area via an RF feeder. The RFS is mainly to select and connect a corresponding antenna connected with a branch port, by connecting the branch port with the public port under the control of the RF processing unit.

As shown in FIG. 2, the AP may further include antennas 1 to 6. In other examples, the AP may not include antennas 1 to 6. That is, antennas 1 to 6 may be respectively connected with each RFS of the AP via a cable.

Figure 3:
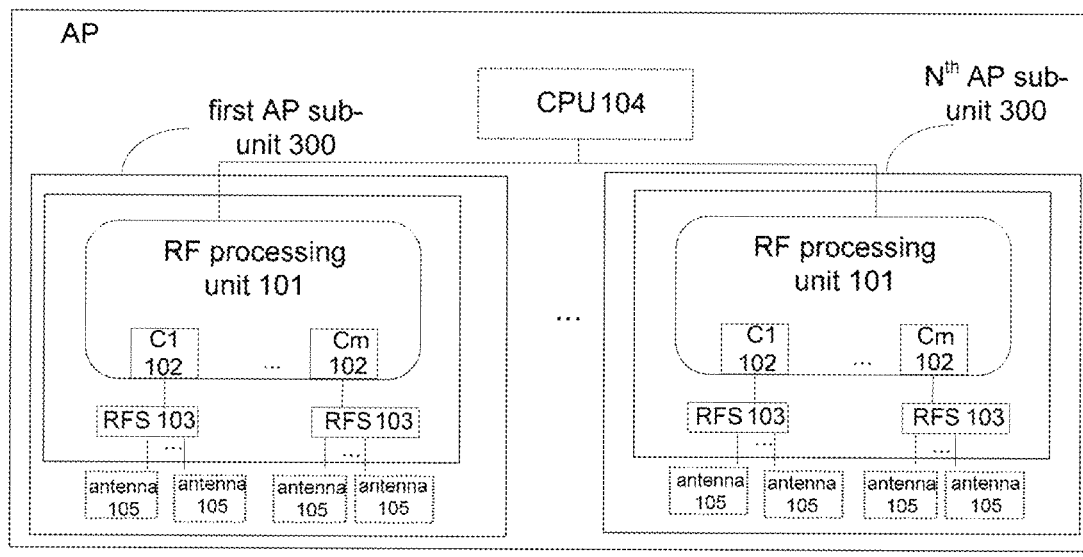
FIG. 3 is a schematic diagram illustrating a logical structure of an AP, in accordance with still another example of the present disclosure.

With reference to FIG. 3, in an example, the AP may include N AP sub-units 300. As shown in FIG. 3, each AP sub-unit 300 may include M groups of antennas 105. In other examples, each AP sub-unit 300 may be connected with the M groups of antennas via cables. That is, the AP sub-unit may not include the M groups of antennas shown in FIG. 3. It should be noted that, when N=2, that is, the AP shown in FIG. 3 includes two AP sub-units 300, M may be a natural number greater than or equal to 1. That is, at this time, each AP sub-unit 300 may include one or more RF chains.

The AP may further include a CPU 104.

That is, in the example illustrated with FIG. 3, the AP may include N (N is a natural number greater than or equal to 1) RF processing units, and N*M (M is a natural number greater than or equal to 1) RFSs. The RF processing unit may include M RF chains, which respectively connect with a public port of an RFS. Each RF chain refers to a separate path. A divided RF signal from a baseband unit may be transmitted along with the separate path. Each RFS may include P branch ports (P is a natural number which is greater than or equal to 2). A branch port of each RFS is configured to respectively connect with one of P independent antennas, which is deployed in a different indoor area by using an RF feeder. Under the control of the RF processing unit, the RFS is mainly configured to select and connect a corresponding antenna coupled with a branch port, by connecting the branch port with the public port.

Figure 4:
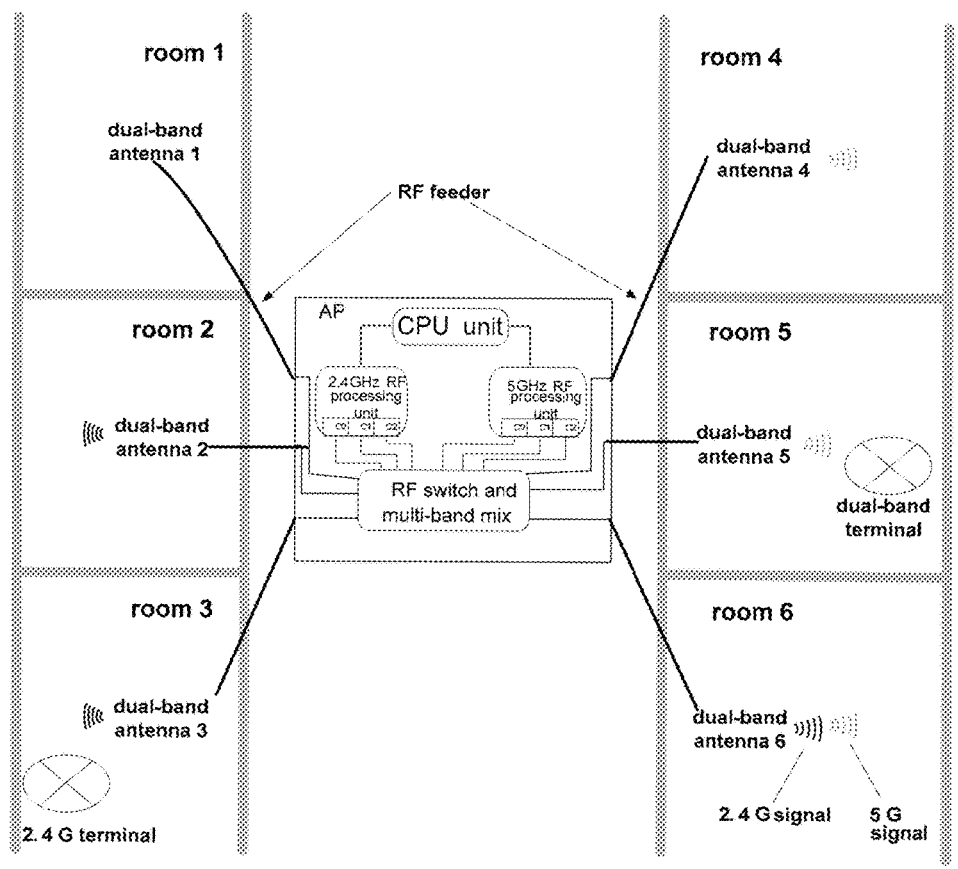
FIG. 4 is a schematic diagram illustrating a deployment of an AP shown in FIG. 2 in an indoor environment, in accordance with an example of the present disclosure.

With reference to FIG. 4, in an exemplary mode for deploying an indoor distributed AP, which is put forward by an example of the present disclosure, structure of the AP may be that as shown in FIG. 2. Specifically speaking, the AP may include first and second RF processing units. The first RF processing unit works in 2.4 GHz band, while the second RF processing unit works in 5 GHz band. Each RF processing unit may connect with three RF chains C0, C1 and C2, which work in a same band. Each RF chain may connect with a public port of an RFS. As mentioned above, an RFS may include multiple branch ports. That is, one of multiple antennas may be selected and connected. In the exemplary mode, value of P is 2, so the RFS may be understood as a single pole double throw (SPDT) RFS. Two branch ports of each RFS may be connected via respective combiners to different dual-band antennas. As shown in FIG. 2, the MIX is a multi-band combiner, which is configured to combine RF signals of multiple bands to a single feeder, and transmit to a single antenna. In an example of the present disclosure, designs of the first and the second RF processing units are symmetrical. Thus, signals outputted by two RF processing units may be coupled to a same dual-band antenna via a combiner. E.g. chain C0 of the first processing unit may connect to antenna 1 and chain C0 of the second processing unit may also connect to antenna 1. A triple-band antenna may be used instead of dual-band antenna. Generally a multi-band antenna may be used.

Based on FIG. 2, it can be seen that RF signals of the three RF chains in the RF processing unit may be transmitted via three different antennas. That is, the AP may employ an antenna combination consisting of three antennas. A packet may be transmitted or received with a different antenna combination by controlling the selection and the driving of three RFSs. Take FIG. 2 and FIG. 4 into consideration, in an implementation mode, a distributed deployment in the indoor environment of FIG. 4 may be achieved by using the design of FIG. 2. Based on FIG. 2, it can be seen that a pair of antennas, e.g., antenna 1 and antenna 6, may share the RF chain C0 of the first RF processing unit on the left of FIG. 2. Antenna 1 or 6 may be selected and connected with the RF chain C0 by controlling a corresponding RFS. Antennas 1 and 6 may not be simultaneously selected and connected. Similarly, another pair of antennas, e.g., antennas 2 and 5, may share the RF chain C1 of the first RF processing unit while a pair of antennas, e.g., antennas 3 and 4, may share the RF chain C2 of the first RF processing unit. In practical applications, selections of the three RFSs may be adjusted by a logical controlling mechanism. If the first RF processing unit is set up to handle three RF chains and each RF chain is connected to a pair of antennas via a RF switch, then the first RF processing unit is capable of driving 8 different antenna combinations, each combination consisting of three antennas.

With reference to FIG. 4, antennas 1 to 6 may be respectively deployed in rooms 1 to 6 with RF feeders. Suppose a wireless terminal working in the 2.4 GHz band is located in room 3, generally speaking, a wireless terminal in a room may learn antennas in the room and adjacent rooms. At this time, an antenna combination consisting of antennas 2, 3 and 6 may provide a better signal strength for the wireless terminal as these antennas are closest to the terminal in room 3. The foregoing antenna combination may be understood as a better antenna combination, which may be "seen" by the wireless terminal. At this time, the first RF processing unit may control an RFS, such that the three RF chains C1, C2 and C0 may receive and transmit a packet via antennas 2, 3 and 6.

When each RF chain of a RF processing unit is connected to a pair of antennas, it is better to deploy each antenna of the pair in a different area (e.g. in different rooms in a building) and better if they are deployed far away from each other (e.g. in rooms which are far apart in FIG. 4). While for antennas coming from different antenna pairs, they may be deployed in two areas relatively close to each other. As antennas in the same pair are not active at the same time, the above deployment of antennas helps to ensure a wireless terminal in a particular room or location is more likely to simultaneously "see" strong signals from three different antennas, which is helpful for implementing MIMO.

Figure 5:
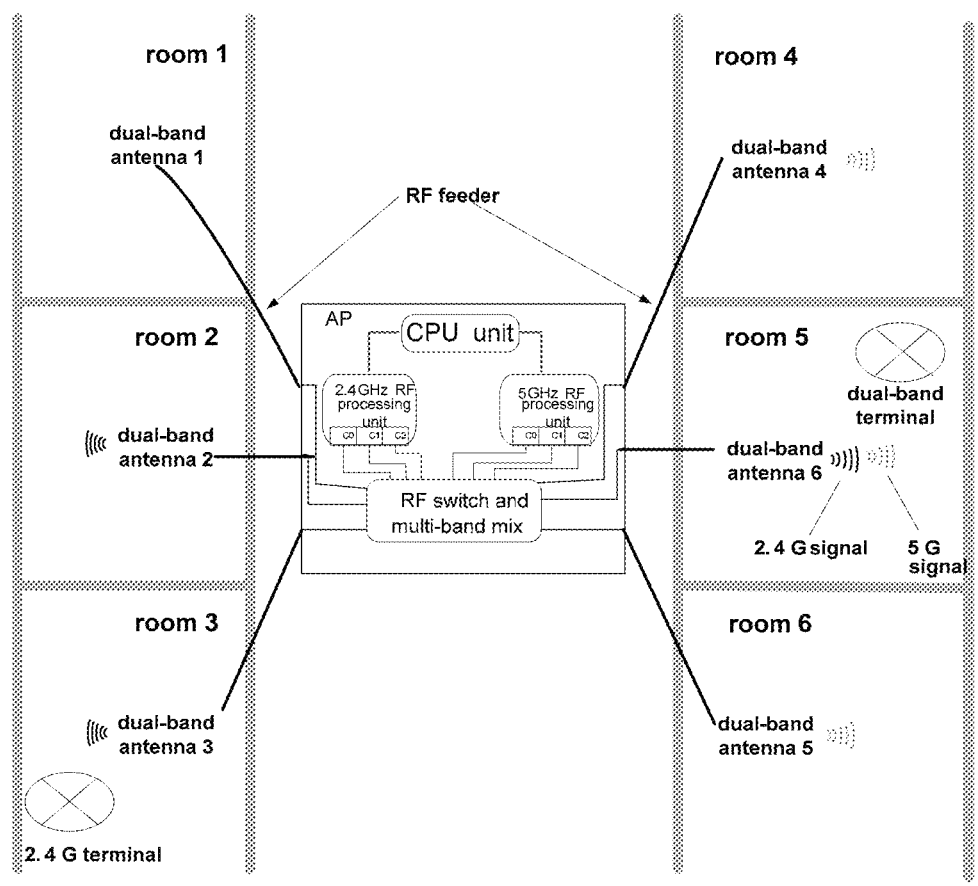
FIG. 5 is a schematic diagram illustrating a deployment of an AP shown in FIG. 2 in an indoor environment, in accordance with another example of the present disclosure.

With reference to FIG. 5, suppose locations of antennas 5 and 6 in FIG. 4 have been exchanged, at this time, an antenna combination which may be seen by the wireless terminal working in the 2.4 GHz band of room 3 is antennas 2 and 3, or antennas 3 and 5. As mentioned above, based on FIG. 2, it can be seen that a pair of antennas, antennas 1 and 6, may share the RF chain C0 of the first RF processing unit, in which the first RF processing unit refers to the RF processing unit working in the 2.4 GHz band. Antenna 1 or 6 may be selected and connected with the RF chain C0 by controlling an RFS. Antennas 1 and 6 may not be simultaneously selected and connected. Similarly, another pair of antennas, e.g., antennas 2 and 5, may share the RF chain C1 of the first RF processing unit while a pair of antennas, e.g., antennas 3 and 4, may share the RF chain C2 of the first RF processing unit. At this time, an antenna combination which may be seen by the wireless terminal working in the 2.4 GHz band of room 3 is antennas 2 and 3, or antennas 3 and 5. That is, the RF chains C1 and C2 of the first RF processing unit may be employed by the wireless terminal. However, the RF chain C0 of the first RF processing unit may be not employed. Subsequently, an access rate of the wireless terminal may be greatly reduced. Thus, based on the foregoing descriptions about FIG. 4, it can be seen that before exchanging the locations of antennas 5 and 6, an antenna combination of antennas 2, 3 and 6 provides a service for the wireless terminal that is a better antenna combination. The foregoing deployment mainly refers to usage operations performed on an AP by a user.

In an example of the present disclosure, an RF processing unit may employ a reasonable antenna combination to serve a wireless terminal by using a logical controlling mechanism. A switching process depends on access state of a wireless terminal sensed by a CPU. In an implementation mode of the present disclosure, the CPU may sense access state of a wireless terminal by using a strength parameter of a terminal signal. One example of operation of an AP in the present disclosure according to the present disclosure will now be described.

In an example of the present disclosure, an antenna combination employed by the RF processing unit may be determined by an RF controlling sub-unit. The RF controlling sub-unit may be implemented as a logical module in the first RF processing unit (for example machine readable instructions executed by a processor or a dedicated hardware chip). To facilitate understanding, the RF controlling sub-unit is shown as a separate unit in FIG. 2 but may in fact be integrated into other circuitry or processors of the AP. While a single RF controlling sub-unit is shown in FIG. 1, there may be two separate RF controlling sub-units: a first RF controlling sub-unit may belong to the first RF processing unit; and a second RF controlling sub-unit may belong to a second RF processing unit According to MIMO an AP may use a plurality of antennas to receive a signal. In the present disclosure, an RF processing unit of the AP may be able to select from among a plurality of antenna combinations (each antenna combination including three antennas). In the example of FIG. 2, each RF processing unit may be able to select from up to 8 combinations of three antennas. During a process of receiving a signal by an AP, the RF processing unit may change an antenna combination used for receiving a packet according to a predetermined time period. Each time the RF controlling sub-unit in the RF processing unit may control the three RFSs to switch to a different antenna combination to receive a packet.

Specifically speaking, the process for the RF processing unit changing an antenna combination used for receiving a packet, according to a predetermined time period may refer to the following. For a wireless terminal, the RF processing unit may periodically change limited antenna combinations to receive a packet, based on a predetermined time period.

Specifically speaking, based on the example illustrated with FIG. 2, take the 2.4 GHz RF processing unit as an example, processing procedure of the 5 GHz RF processing unit is similar. For a wireless terminal, the 2.4 GHz RF processing unit may control the RFS to switch to different antenna combination to receive a packet from the wireless terminal. Suppose three antennas, which respectively correspond to C0, C1 and C2, are employed to receive the packet each time, there may be up to 8 kinds of antenna combinations for the three antennas, which may be respectively antennas 1, 2 and 3, antennas 1, 2 and 4, antennas 6, 2 and 3, antennas 6, 2 and 4, antennas 1, 5 and 3, antennas 1, 5 and 4, antennas 6, 5 and 3, as well as antennas 6, 5 and 4.

For example, based on the sequence of the eight kinds of antenna combinations list above, under the control of the CPU, the 2.4 GHz RF processing unit in FIG. 2 may change an antenna combination used for receiving a packet from the wireless terminal every millisecond.

Specifically speaking, FIG. 6 is a schematic diagram illustrating how to change an antenna combination to receive a packet by an RF processing unit based on a predetermined time period, in accordance with an example of the present disclosure. As shown in FIG. 6, the 2.4 GHz RF processing unit may employ the foregoing first kind of antenna combination to receive a signal from the wireless terminal at the first millisecond. The 2.4 GHz RF processing unit may employ the foregoing second kind of antenna combination to receive a signal from the wireless terminal at the second millisecond, and so on. The 2.4 GHz RF processing unit may employ the foregoing eighth kind of antenna combination to receive a signal from the wireless terminal at the eighth millisecond. And then, a second cyclic process may be started. That is, the 2.4 GHz RF processing unit may employ the foregoing first kind of antenna combination to receive a signal from the wireless terminal at the ninth millisecond, and so on. The 2.4 GHz RF processing unit may employ the foregoing eighth kind of antenna combination to receive a signal from the wireless terminal at the sixteenth millisecond. Subsequently, a third cyclic process may be started, and so on.

It should be noted that, in the foregoing example, change an antenna combination used for receiving a signal from a wireless terminal every millisecond is exemplary. In practical applications, the RF processing unit may also employ another predetermined time period to change the antenna combination used for receiving a signal.

Since the receiving sensitivity of the AP in most cases is still relatively strong, even when the antenna combination used for receiving a signal is not the optimum one, sometimes using a less than optimum antenna combination may still be acceptable to the user. Since signal reception of an AP corresponds to uplink flow of a wireless terminal, even if the receiving performance of the AP is slightly worse, it may be accepted by a user. Since downlink flow is much larger than uplink flow in most cases, when a user accesses a network, the uplink and downlink flows of the user is an exemplary asymmetrical model.

Specifically speaking, judging from the transmission side of an AP, when a control packet or a data packet is to be transmitted to a certain wireless terminal, a CPU may transmit the control packet (or the data packet) and a corresponding antenna combination of the wireless terminal to a baseband processing (BBP) unit in the manner of a digital signal. After converting the digital signal into an RF modulation signal, the BBP unit may submit the RF modulation signal to the first RF processing unit. After receiving the RF modulation signal, the first RF processing unit may buffer the received RF modulation signal. When outputting the packet, the first RF processing unit may generate a corresponding RF signal. Subsequently, the RF controlling sub-unit of the first RF processing unit may control the three RFSs to select and connect multiple antennas corresponding to the identifier of the antenna combination. As mentioned in the foregoing examples illustrated with FIG. 1 to FIG. 5, select and connect multiple antennas may be understood as selecting and driving multiple antennas.

As mentioned above, when a packet is to be transmitted to a wireless terminal, the CPU needs to learn which antenna combination is better to serve the wireless terminal. In an example of the present disclosure, the CPU may obtain an identifier of an antenna combination corresponding to the wireless terminal by searching in a terminal service table.

After receiving an RF signal with the current antenna combination, the RF processing unit may restore a corresponding packet, transmit the packet and corresponding current signal strength (that is, signal strength received by the AP) to the BBP unit to be processed in the manner of RF modulation signal. The BBP unit is configured to convert the received RF modulation signal into a data signal, and transmit the data signal to the CPU to be processed. The CPU may search in the terminal service table according to the identifier of the wireless terminal transmitting the packet. When no matching entry in the terminal service table is found, the CPU may generate a new entry, which includes the identifier of the wireless terminal transmitting the packet (such as the source Media Access Control (MAC) of the packet), the identifier of current antenna combination, and current signal strength. The CPU adds the new entry to the terminal service table. Under the circumstances that the CPU searches in the terminal service table and finds a corresponding entry, the CPU may further determine if the identifier of current antenna combination is the same as an identifier of an antenna combination in the entry. When the identifier of current antenna combination is the same as the identifier of the antenna combination in the entry, the CPU may take current signal strength as a signal strength corresponding to the entry of the terminal service table. When the identifier of current antenna combination is not the same as the identifier of the antenna combination in the entry, the CPU may determine if a difference between current signal strength and the signal strength in the entry achieves a predetermined threshold. When the difference achieves the predetermined threshold, the CPU may respectively take the identifier of current antenna combination and current signal strength as the identifier of antenna combination and signal strength in the entry.

Subsequently, when needing to transmit a packet to a wireless terminal, the CPU may firstly search in the terminal service table for an entry corresponding to the identifier of the wireless terminal. When determining that there is an entry in the terminal service table corresponding to the identifier of the wireless terminal, the CPU may transmit the packet to the wireless terminal, by using the antenna combination in the entry corresponding to the identifier of the wireless terminal.

It should be noted that, an antenna combination used for receiving a packet from a wireless terminal is the same as the antenna combination used for transmitting a packet to the wireless terminal.

When a wireless terminal does not transmit any packet initially, there is no entry corresponding to the identifier of the wireless terminal in the terminal service table of the AP. That is, the AP has not learned which antenna combination may be employed to transmit a packet to the wireless terminal. In fact, another function of the AP is to initiate communications in a wireless local area network (WLAN). Generally speaking, an AP may transmit a beacon packet to declare the AP's existence. That is, the AP may inform a wireless terminal about a service set identifier (SSID) of the AP. Subsequently, the wireless terminal may determine if it is to access the network. In an implementation mode, the CPU may transmit a beacon packet periodically with different antenna combinations, such that existence of a wireless network may be declared. When transmitting the beacon packet, the CPU may inform the RF processing unit about a parameter of an antenna combination corresponding to the beacon packet similarly. Since the beacon packet is a broadcast packet, it is not necessary to search in the terminal service table. As mentioned above, since the number of antenna combination is generally limited, such as 8, it may be ensured that all of the wireless terminals in an area may receive the beacon packet by changing the antenna combination used for transmitting the beacon packet periodically. That is, the processing mechanism of the present disclosure may not affect the process of a wireless network from announcing its presence.

As mentioned above, the RF processing unit may receive an RF signal with different antenna combinations periodically. Once a user has transmitted a beacon response packet, an AP may receive the beacon response packet with current antenna combination. Since it is the first time that a wireless terminal transmits a packet to the AP, there is no corresponding entry in the terminal service table. That is, no entry will be found when searching in the terminal service table. At this time, the CPU may add a new entry, which includes the identifier of the wireless terminal (such as MAC address), current antenna combination identifier, and signal strength, to the terminal service table.

However, the antenna combination corresponding to the antenna combination identifier stored in the terminal service table may be not the better one. On the one hand, an AP may receive a signal by using different antenna combinations in turn. Thus, there is no guarantee that an antenna combination first used to receive a user packet is a better antenna combination under the circumstances that a packet was sent to a wireless terminal. On the other hand, even if the antenna combination corresponding to the antenna combination identifier currently stored in the terminal service table is a better antenna combination, since a wireless terminal is movable, it may move to another room from room 3. A better antenna combination may change in the foregoing another room. In addition, when transmitting a packet to a wireless terminal, a better antenna combination is dynamic, taking into account factors such as interference and new obstacles. Since these factors are taken into consideration, in an example of the present disclosure, when receiving a packet, a CPU of an AP may determine if it is necessary to update the terminal service table. The objective is to update the antenna combination identifier corresponding to the antenna combination used for serving a wireless terminal, which is stored in the terminal service table, by continuously comparing signal strength so that the antenna combination corresponding to the antenna combination identifier stored in the terminal service table is a better antenna combination.

A better antenna combination mentioned in the present disclosure is defined by a developer, which may be not the best. For a simple example, suppose the signal strength corresponding to antenna combination 1 stored in the terminal service table is 20 while signal strength corresponding to current antenna combination 2 is 21. At this time, current antenna combination 2 may not be taken as the antenna combination identifier stored in the terminal service table, which is dependent on a threshold selected by a developer. The threshold may be flexibly selected. The threshold may be selected according to requirements of actual application. A smaller threshold or a larger threshold may be selected. When the threshold is larger, an antenna combination corresponding to the antenna combination identifier stored in the terminal service table may be stable, which may be not frequently updated. When the threshold is smaller, the state is just the opposite. In addition, when a wireless terminal leaves a network, e.g., an AP actively removes the authentication, or the wireless terminal is actively offline, or the wireless terminal does not respond for a long time, the CPU may at this time delete an entry in the terminal service table that corresponds to the wireless terminal so as to avoid taking up too many resources.

An implementation mode about an AP, which includes an RF processing unit, is described in the above with reference to FIG. 2, FIG. 3, FIG. 4 and FIG. 5. It is easily understood that, in other implementation modes, an AP may include multiple RF processing units that work in different bands. At this time, the AP may be understood as including multiple radios, which may also be understood as including multiple SSIDs from the network level. In an exemplary implementation, when an AP includes two RF processing units, which respectively work in the 2.4 GHz and the 5 GHz bands, it is necessary to guide the dual-band wireless terminal. That is, when a wireless terminal simultaneously supports the 2.4 GHz and the 5 GHz bands, the CPU of the AP may guide the wireless terminal to work in 5 GHz band by using multiple means, such as denial of service. In other words, an RF processing unit working in the 5 GHz band may be connected. Thus, some wireless terminals may be guided to leave the crowded 2.4 GHz band, such that the effect of balanced loads may be achieved.

As shown in FIG. 4, when a dual-band terminal in room 5 is guided to work in 5 GHz band, an antenna combination that may be seen by the dual-band terminal is antennas 4, 5 and 6. As mentioned above, based on FIG. 2, it can be seen that, a pair of antennas, e.g., antennas 1 and 6 may share the RF chain C0 of the first RF processing unit. Another pair of antennas, e.g., antennas 2 and 5, may share the RF chain C1 of the first RF processing unit while another pair of antennas, e.g., antennas 3 and 4, may share the RF chain C2 of the first RF processing unit. At this time, the dual-band terminal in room 5, which works in the 5 GHz band, may employ the RF chains C0, C1 and C2 of the first RF processing unit. Thus, an access rate of the dual-band terminal is relatively high. That is, an antenna combination of antennas 4, 5 and 6, which provides a service for current dual-band terminal, is a better antenna combination.

Based on foregoing descriptions, it can be seen that in an example of the present disclosure, a new design architecture of RF part of an AP is provided, and which antenna combination is suitable for transmitting a packet to a wireless terminal may be determined by utilizing a receiving process. Thus, access experience of a wireless terminal may be greatly improved. Take 802.11n as an example, in foregoing implementation mode, an access rate of a wireless terminal may achieve 450 Mbps theoretically with 3*3 MIMO. Further, deployment of the present disclosure may achieved relatively easily and at reasonable cost. Further, the above described method does not require power dividers, which are relatively expensive. Furthermore, a good access experience may be provided for a wireless terminal of a user, e.g., a faster access rate may be provided.

The foregoing present examples of the present disclosure, which is not used for limiting the present disclosure. Any modifications, equivalent substitutions, and improvements made within the spirit and principle of the present disclosure should be covered by the protection scope of the utility model.

The invention claimed is:

1. An access point (AP), comprising a central processing unit (CPU), radio frequency (RF) processing units, and RF switches (RFSs), where an amount of RFSs depends on an amount of RF processing units and an amount of RF chains, and wherein:
   each RFS comprises a public port and at least two branch ports, the at least two branch ports being respectively connected by RF feeders to at least two antennas deployed in different indoor areas;
   each RFS selects and connects an antenna corresponding to a branch port by connecting the branch port with the public port under the control of an RF processing unit;
   the CPU determines a plurality of antenna combinations and selects a first antenna combination of the plurality of antenna combinations based on a signal strength of a wireless terminal with a subset of antennas of the first antenna combination;
   the CPU changes from the first antenna combination to a second antenna combination of the plurality of antenna combinations according to a predetermined time period; and
   wherein:
   the RF processing unit comprises RF chains each correspondingly connected with a public port of an RFS; and
   the RF processing unit transmits a packet to the wireless terminal based on the second antenna combination for the wireless terminal.

2. The AP according to claim 1, wherein when the packet is to be transmitted to the wireless terminal, the CPU searches a terminal service table for an antenna combination identifier corresponding to the wireless terminal and submits the packet and the antenna combination identifier to the RF processing unit; and
   the RF processing unit controls RFSs to select and connect antennas corresponding to the antenna combination identifier and transmits the packet via the RF chains using the antennas corresponding to the antenna combination identifier.

3. The AP according to claim 2, wherein:
   the CPU determines another antenna combination identifier corresponding to an antenna combination to be used to receive another packet, and transmits the another antenna combination identifier to the RF processing unit; and
   the RF processing unit:
   selects and connects antennas corresponding to the another antenna combination identifier by controlling the RFSs; and
   receives the another packet with the antennas corresponding to the another antenna combination identifier.

4. The AP according to claim 3, wherein:
   the CPU transmits an additional antenna combination identifier corresponding to the second antenna combination to the RF processing unit; and
   the RF processing unit:
   selects and connects antennas corresponding to the additional antenna combination identifier by controlling the RFSs; and
   receives an additional packet from the wireless terminal.

5. The AP according to claim 3, wherein the RF processing unit submits the another packet and a corresponding current signal strength to the CPU; and
   after receiving the another packet, the CPU searches for a matching entry in the terminal service table according to an identifier of the wireless terminal transmitting the another packet;
   when no matching entry in the terminal service table is found, the CPU adds to the terminal service table a new entry with the identifier of the wireless terminal, the another antenna combination identifier, and the current signal strength;

when a matching entry in the terminal service table is found, the CPU determines if the another antenna combination identifier is the same as an existing antenna combination identifier in the entry;

when the another antenna combination identifier is the same as the existing antenna combination identifier in the entry, the CPU updates the entry by replacing an existing signal strength in the entry with the current signal strength;

when the another antenna combination identifier is different from the existing antenna combination identifier in the entry, the CPU determines if a difference between the current signal strength and the existing signal strength in the entry has achieved a predetermined threshold;

when the difference between the current signal strength and the existing signal strength in the entry has achieved the predetermined threshold, the CPU updates the entry by replacing the existing antenna combination identifier and the existing signal strength in the entry with the another antenna combination identifier and the current signal strength.

6. The AP according to claim 5, wherein the CPU is further to guide the wireless terminal, which works in the bands of the first and the second RF processing units, to work in the band of the second RF processing unit.

7. The AP according to claim 2, wherein the CPU is further to periodically change the antenna combination identifier, which corresponds to an antenna combination used for transmitting a beacon packet.

8. The AP according to claim 1, wherein the antennas are multi-band antennas, the AP comprises a first RF processing unit and a second RF processing unit that work in different bands, and each RF processing unit shares a same number of the multi-band antennas.

9. The AP according to claim 1, wherein the RF chains in the RF processing unit work in a same band.

10. The AP according to claim 1, wherein the the AP includes two or more RF chains and two or more RFSs.

11. An access point (AP), comprising a central processing unit (CPU), radio frequency (RF) processing units, RF switches (RFSs), and groups of antennas, wherein:

each RFS comprises a public port and at least two branch ports, the at least two branch ports being respectively connected by RF feeders to at least two antennas deployed in different indoor areas;

each RFS selects and connects an antenna corresponding to a branch port, by connecting the branch port with the public port under the control of an RF processing unit;

the CPU determines a plurality of antenna combinations and selects a first antenna combination of the plurality of antenna combinations based on a signal strength of a wireless terminal with a subset of antennas of the first antenna combination;

the CPU changes from the first antenna combination to a second antenna combination of the plurality of antenna combinations according to a predetermined time period; and wherein:
the RF processing unit comprises RF chains each correspondingly connected with a public port of an RFS; and
the RF processing unit transmits a packet to the wireless terminal by controlling a corresponding RFS to select and connect an antenna correspondingly connected with a branch port based on the second antenna combination for the wireless terminal.

12. The AP according to claim 11, wherein when the packet is to be transmitted to the wireless terminal, the CPU searches a terminal service table for an antenna combination identifier corresponding to the wireless terminal and submits the packet and the antenna combination identifier to the RF processing unit; and the RF processing unit controls RFSs to select and connect antennas corresponding to the antenna combination identifier and transmits the packet via the RF chains by using the antennas corresponding to the antenna combination identifier.

13. The AP according to claim 12, wherein the CPU transmits an additional antenna combination identifier corresponding to the second antenna combination to the RF processing unit; and the RF processing unit:
selects and connects antennas corresponding to the additional antenna combination identifier by controlling the RFSs; and
receives an additional packet from the wireless terminal.

14. The AP according to claim 12, wherein the RF processing unit submits another packet and a corresponding current signal strength to the CPU; and after receiving the another packet, the CPU searches for a matching entry in the terminal service table according to an identifier of the wireless terminal transmitting the another packet;

when no matching entry in the terminal service table is found, the CPU adds to the terminal service table a new entry with the identifier of the wireless terminal, current antenna combination identifier, and the current signal strength;

when a matching entry in the terminal service table is found, the CPU determines if the current antenna combination identifier is the same as an existing antenna combination identifier in the entry;

when the current antenna combination identifier is the same as the existing antenna combination identifier in the entry, the CPU updates the entry by replacing an existing signal strength in the entry with the current signal strength;

when the current antenna combination identifier is different from the existing antenna combination identifier in the entry, the CPU determines if a difference between the current signal strength and the existing signal strength in the entry has achieved a predetermined threshold;

when the difference between the current signal strength and the existing signal strength in the entry has achieved the predetermined threshold, the CPU updates the entry by replacing the existing antenna combination identifier and the existing signal strength in the entry with the current antenna combination identifier and the current signal strength.

15. A method, comprising:
selecting and connecting, by radio frequency (RF) switches (RFSs), an antenna of groups of antennas by connecting each branch port of the RFSs with a public port under control by an RF processing unit of RF processing units;

searching, by a central processing unit (CPU), a terminal service table for an antenna combination identifier (ACI) of a wireless terminal to which a packet was transmitted;

searching, by the CPU, the terminal service table for a matching entry in the terminal service table according to an identifier of another packet of the wireless terminal;

adding, to the terminal service table in response to no matching entry being found, a new entry with the ACI of the wireless terminal, current ACI, and current signal strength;

determining, by the CPU, whether:
   the current ACI is the same as an existing ACI in a matching entry in response to the matching entry being found; and
   a difference between the current signal strength and the existing signal strength in the matching entry has achieved a predetermined threshold;

replacing, by the CPU:
   the existing ACI with the current signal strength in response to the current ACI being the same as the existing ACI in the matching entry; and
   the existing ACI and the existing signal strength in the matching entry with the current ACI and the current signal strength in response to the difference between the current signal strength and the existing signal strength having achieved the predetermined threshold.

16. The method of claim 15, wherein the method includes transmitting a packet to the wireless terminal by the RF processing unit by controlling a corresponding RFS to select and connect an antenna correspondingly connected with a branch port of the corresponding RFS based on a predetermined antenna combination for the wireless terminal.

17. The method of claim 15, wherein the method includes controlling RFSs by the RF processing unit when the RF processing unit is transmitting the packet to select and connect antennas corresponding to the ACI.

18. The method of claim 17, wherein the RF processing unit transmits the packet via RF chains comprising the RF processing unit using the antennas corresponding to the ACI, wherein the RF chains are each correspondingly connected with a public port of an RFS.

19. The method of claim 15, wherein the method includes:
   changing, by the CPU, the antenna combination according to a predetermined time period; and
   transmitting an additional ACI corresponding to the changed antenna combination to the RF processing unit.

20. The method of claim 19, wherein the method includes:
   selecting and connecting, by the RF processing unit, antennas corresponding to the additional ACI by controlling the RFSs; and
   receiving an additional packet from the wireless terminal.

* * * * *